Aug. 22, 1967    G. B. GREENBERG ETAL    3,337,871
SPACE REFLECTOR DEVICE

Filed March 22, 1965    3 Sheets-Sheet 1

INVENTORS
GERALD B. GREENBERG
ROY M. SCHEINER
BY Ruelander + Thomas
ATTORNEYS.

Aug. 22, 1967　　G. B. GREENBERG ETAL　　3,337,871
SPACE REFLECTOR DEVICE
Filed March 22, 1965　　　　　　　　　　　　3 Sheets-Sheet 2
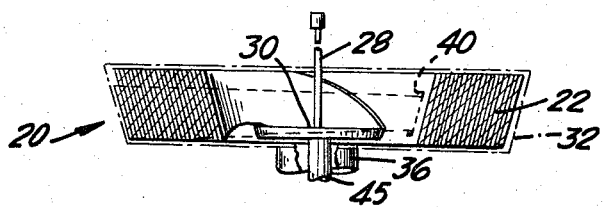
FIG. 6
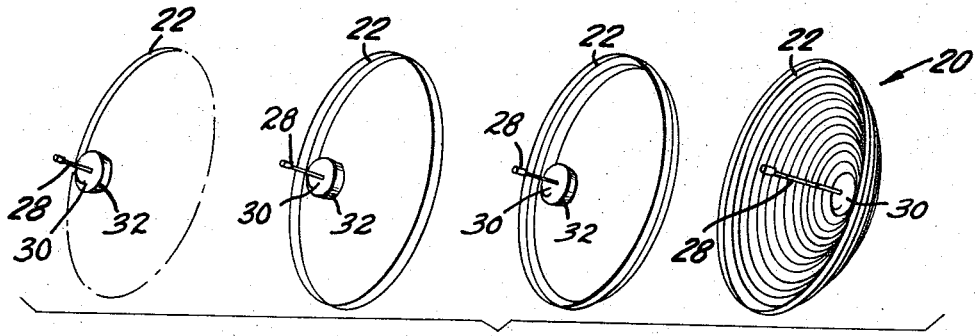
FIG. 7
FIG. 8
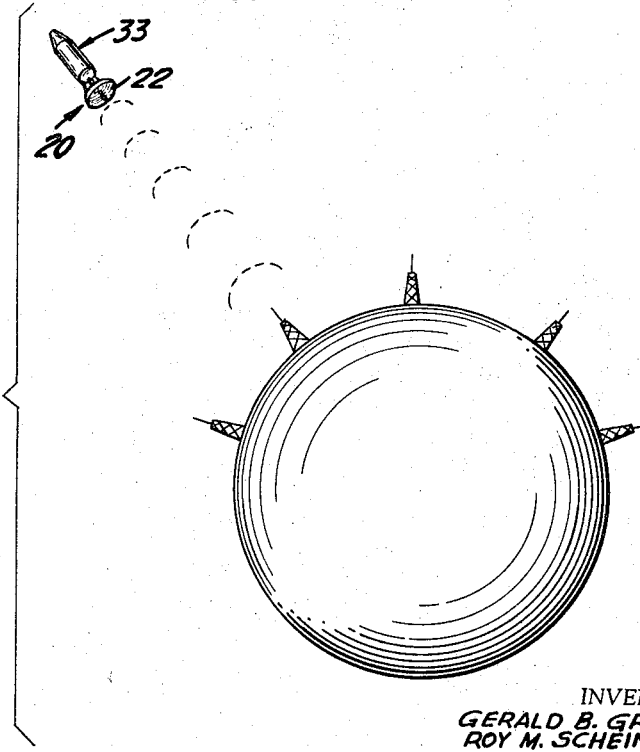
INVENTORS
GERALD B. GREENBERG
ROY M. SCHEINER
BY Auslander & Thomas
ATTORNEYS.

Aug. 22, 1967    G. B. GREENBERG ETAL    3,337,871
SPACE REFLECTOR DEVICE
Filed March 22, 1965    3 Sheets-Sheet 3

INVENTORS
GERALD B. GREENBERG
ROY M. SCHEINER
BY
ATTORNEYS.

United States Patent Office 3,337,871
Patented Aug. 22, 1967

3,337,871
SPACE REFLECTOR DEVICE
Gerald B. Greenberg, Bronx, and Roy M. Scheiner, Forest Hills, N.Y., assignors to Telar Associates, Inc., New York, N.Y., a corporation of New York
Filed Mar. 22, 1965, Ser. No. 441,665
21 Claims. (Cl. 343—18)

This invention relates to space devices wherein surfaces of varying area and volume may be carried to outer space for desired uses.

One such use relates to reflectors for use in communications, more particularly to a novel reflector structure efficacious for use in communication systems for outer space.

It is well known to utilize parabolic reflectors in optical and electromagnetic wave communications systems to provide a tight collimated parallel beam of radiation and to thereby avoid or minimize attenuation of the radiation as received at the receiving point. The paraboloid construction for reflectors is particularly advantageous for use since radiation radiating from its focus to the parabolic surface is reflected from its surface in a substantially parallel beam. Furthermore, if the parabolic reflector is chosen to be sufficiently large such that the distance between it and its focal point is at least a plurality of wave lengths of the electromagnetic waves being reflected, the wave produced across the mouth of the reflector is substantially a plane wave whereby there results very little divergence of the beam. Such divergence has to be minimized as much as possible since it is readily appreciated that where radiation is transmitted for a substantial distance, for example, from a point in outer space to the earth, the whole earth subtends only a small percentage of the area of the wave front. When it is further considered that the receiver on the earth occupies only one small point on the earth's surface, it is apparent that the transmitted signal from space may be so attenuated many times that upon its reception it may be actually unintelligible from background noise.

Where a parabolic reflector is used in conjunction with an antenna located at its focal point for terrestrial communications to provide a tight intense collimated parallel beam radiation over considerable distances, since such terrestrial system is subject to the normal gravitational forces and since it is usually readily transported from point to point, the problems confronted in connection therewith are essentially the faithfulness of the paraboloid structure. Its weight, size and bulkiness are generally not important factors to consider. Also, it can be chosen to have a size as determined by its use requirement, such size varying from quite small to extremely large.

Clearly for communications in outer space, i.e., communications between a point in outer space and the earth, or between points in outer space, to attain the advantage of preservation of the strength of transmitted signals it is equally desirable to utilize a paraboloid reflector. However, different from a paraboloid reflector constructed for use in terrestrial communication systems, the parabolic reflector to be used in space communications of necessity has to be quite large to enable the construction of an efficient communication system which will function over large distances and also has to be quite large in size with respect to the vehicle that transports it into space. Consequently, any reflector that is to be used for outer space communications must be initially so constructed as to be capable of being stored in the comparatively small space provided in the transporting vehicle. In addition, the reflector must also be capable of being released from the vehicle and set up for operation when the vehicle reaches a point in outer space intended for the placing of the reflector. If possible, the paraboloid reflector to be placed at a point in outer space should be capable of being retracted into and extended from some sort of housing once it has been placed for operation so that it can be moved from point to point in outer space. This is readily appreciated when it is realized that if any change in the position of the reflector is carried out, it is subjected to forces of acceleration and deceleration and in the reflector's "extended" set-up state, these forces might tend to distort the shape of the reflector beyond its elastic ability to recover its desired configuration. Any such distortion of its original, ideal paraboloidal shape of necessity would alter the ideal reflective properties which are necessary for intelligible transmission and reception of intelligence and information. The reflector should be retractable also to protect it from meteoric showers whose periods of occurrence can be predicted. Another important factor in the design of a parabolic reflector for use in outer space communications is the weight limitations imposed thereon since the weight of a vehicle sent into space is dependent upon the rocket "payload" or thrust and ideally the reflector should therefore be made as low in weight as is possible. However, such lowness in weight cannot compromise the strength and durability of the reflector and the reflector has to consist of a material which retains its strength and which retains its idealized configuration rigorously.

Heretofore, for outer space communications, there have been utilized essentially two types of reflectors, viz., the "balloon-type" reflector and the "umbrella-type" reflector. The balloon-type reflector is a large balloon which is constructed of a thin strong plastic film and is made such that when it is inflated, one surface of the balloon forms a paraboloidal surface of desired predetermined size and shape. This paraboloidal surface of the inflated balloon is then coated with a materail which reflects radio waves, the non-coated portion being transparent to radio waves. The coated inflated balloon is then deflated and a small quantity of a powder, which, when sublimated, produces a gas, expanding. The collapsed balloon is then sealed, folded and packed into a space vehicle. When the vehicle reaches a given destination in space, the powder inside it is automatically sublimated and a gas is produced which expands the balloon, thereby inflating it and setting up its parabolic reflector for use. The balloon-type reflector has not proven to be satisfactory, essentially for the reason that it does not maintain its exact shape in space for any extended period of time. The reason for this is that the gas thereinside, gradually diffuses out of the balloon into the vacuum of space by the process of osmosis. Further, it is not possible to protect the balloon from small meteors, once it has been so inflated, since there is no practical way of automatically deflating the balloon for storage in a protective housing and then re-inflating it for use. Consequently, showers of even the smallest meteors, which hit the inflated balloon, will punch some holes in it, thereby accelerating the escape of gas therefrom, with a resulting more rapid deterioration of the balloon shape. Of course, once the shape of the balloon is altered, there will consequently be a deviation of its reflecting surface from its original paraboloidal shape and its ideal reflector properties will be destroyed. Consequently, it becomes substantially useless for communications work.

The umbrella-type reflector is a large umbrella structure which is constructed substantially exactly like the known umbrella that has been turned inside-out by a sudden gust of wind, such structure has a surface that is suitably curved for use as a parabolic reflector without requiring any of the umbrella's rib structures which is advantageous since such rib structures would drastically interfere with the umbrella's ability to properly reflect. The umbrella-type reflector can be readily designed so that it can be opened and closed when desired, in order to render it some protection against meteor showers and in order that it can be moved from point to point in space without subjection to forces of acceleration and deceleration while it is in its open condition. In operation, the surface of the umbrella is coated and transported to its destination in space in the closed condition, at which place it is automatically opened and is then ready for use as a parabolic reflector.

While the umbrella-type parabolic reflector is capable of being stored in a relatively small area, and while it can be opened for use and then closed for protection and for movement from place to place, and although it is relatively lightweight, it still presents a basic disadvantage in that it is inherently unsatisfactory as a parabolic reflector. The reason for such inadequacy is that it is impossible to achieve a true paraboloidal surface using the umbrella design principle. This is because when the umbrella is open, its fabric is of necessity stretched in such a manner over what short ribs it has, whereby the fabric tends to flatten out or sag between each rib, consequently, since a true paraboloidal surface cannot be achieved with the umbrella-type parabolic reflector, perforce, it cannot have ideal reflective properties, and therefore, its value for operation in space communications is severely limited. It is well to note in addition that the umbrella-type reflector is a foldable structure which is intrinsically of comparatively complicated construction. Its complexity tends to make it unreliable in its mechanical operations and therefore, especially unsatisfactory for use in space communications.

According to the present invention, a reflector, among other things, is provided for use in outer space communications that is durable and substantially permanently maintaining its original predetermined configuration and the integrity of its reflecting surface when it is situated in outer space. Optional surfaces of rotation may further be provided for other spatial uses. The primary utility being set forth in detail herein as a reflector.

Essentially a resilient substance may be cut as in a helical or spiral form so that it may be in-wound on a spindle or onto itself into a housing, having a lesser area and volume than such configuration. The natural resilience of the substance in the non-gravitational area of outer space permits an outwinding, allowing the object to assume its original form as the inherent resilience of the substance outwound, acts upon itself to reassume its original shape.

The easiest configurations assemblable are, of course, regular figures of rotation spirally cut. Within the scope of the invention is contemplated the compaction of other shapes such as ellipsoids.

Each shape upon inwinding, either upon itself about an axis on a spindle, or on a spindle form will have its own particular in-wound configuration.

The limitation upon the windability and outwindability is the size into which the figure is to be compressed and its weight in some cases. Where the nature of the shape does not permit of cutting into coil convolutions which are substantially regular, the shape is limited by the qualities of the materials employed.

In inwinding or outwinding irregularities of the convolutions must not be subjected to stresses which alter the original characteristics of resiliences so as to distort the shape exposed in space so that it is not true to its desired shape.

Desired space use also must be considered to determine the exactability of shape required.

Space stations of useable volume may be assemblable from unwound volumes as units or as combined units. A sphere, for instance, may be able to be unwound to extend from a space vehicle or even to surround it. Combined with means not set forth herein the interstices between the convolutions may be sealable to provide enclosed volumes in space.

Cylinders may be placed in space and by means not disclosed herein, capped with hemispheres to form volumes in space with or without the sealing of the interstices.

With difficult shapes, re-inwinding may be foregone if the outwinding produces the desired shape for a particular use. A reflector in accordance with the present invention or other figures of rotation, is capable of being contracted to a volume much less than the volume normally occupied when it is in its operational state, whereby it may be stored in a space vehicle in a minimal amount of space therein.

A parabolic reflector thus constructed is capable of being easily set up to its operational state in outer space from its storage position in a space vehicle.

A surface of rotation in accordance with the present invention may be capable of being repeatedly retracted into and extended from a housing when it is situated in space.

A parabolic reflector in accordance with the present invention may have mechanical operations such as storage, erection, retraction and extension which are automatic and reliable when the reflector is located in space.

A surface of rotation in space in accordance with the present invention may be provided with a relatively low mass and be practicable to construct, using known construction methods and materials.

Generally speaking, and in accordance with the invention, there may be provided a structure which normally assumes a configuration of a pre-determined figure of revolution having a given volume and which is capable of being contracted or wound to a volume substantially less than such given volume. The structure comprises a member having the aforesaid configuration and volume of a strong resilient material and a continuous spiral cut in the member substantially perpendicular to its axis of symmetry, whereby the member can be tightly confined to such lesser volume and which precisely reverts to the predetermined configuration upon release from such confinement.

A method of preparation of the shape for space may comprise, for instance, the steps of shaping a sheet of strong resilient material on a form having the aforesaid configuration to provide a member comprising the resilient material and having such configuration and of a substantially uniform thickness of the material, and making a spiral cut of a chosen width in the formed member to provide a continuous spiral having substantially equal width coils.

Although such novel feature or features believed to be characteristic of the invention are pointed out in the claims, the invention and manner in which it may be carried out may be further understood by reference to the following description and the accompanying drawings.

In the drawings, FIG. 1 is an isometric view of a reflector having a paraboloid of revolution configuration and constructed in accordance with the principles of the invention;

FIG. 6 is a section taken along lines 6—6 of FIG. 5 looking in the direction of the arrows;

FIG. 7 is a plural view of sequential conditions of a reflector during its unwinding from its housing;

FIG. 8 shows a reflector and housing mounted on a space vehicle situated in space away from the earth and reflecting electromagnetic wave information in a substantially tight collimated beam back to a receiving point on the earth;

Referring now to the FIGS. 1–8, the reflector 20 has the configuration of paraboloid of revolution of a predetermined configuration. Such reflector is made by constructing a form to the full size and exact paraboloidal shape desired for the reflector. A sheet of strong resilient material such as highgrade spring steel or other suitable resilient material such as aluminum, magnesium, titanium, elastomers and the like, may be utilized, is shaped over the form to provide a member in which the material has a uniform thickness. Where spring steel is utilized as the material, depending upon the size of the reflector, a thickness of 0.01 inch has been found to be advantageous.

In the case of the paraboloid, for example, it may be formed over a mold of its identical shape. It may even be stamped over such a mold. Once formed into the desired shape, the metal may be heated to relieve the tensions within the metal, then tempered so that the spring-like characteristics of the metal will be resumed and so that the shape and spring-like characteristics will be maintained in the formed shape.

After tempering to render it properly elastic, a continuous metal free spiral path is cut thereinto to result in a paraboloidally shaped metal spiral, it has been found that where it is desired to have a paraboloid reflector having a 30-foot diameter, a spiral cut suitably may be about one half inch in width and the cuts may be about 11½ inches wide.

Other suitable shapes may be made in accordance with the present mode, and even shapes such as spheres may be made in hemispheric parts and joined, such as by welding either before or after cutting of the spiral type patterns which permits of the figure of rotations, inwinding into its housing.

Figure 1:
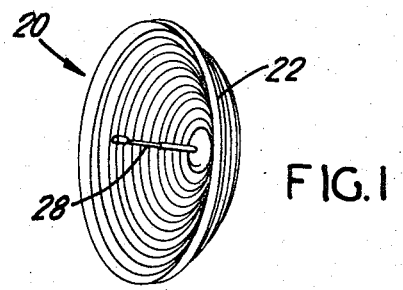
Figure 4:
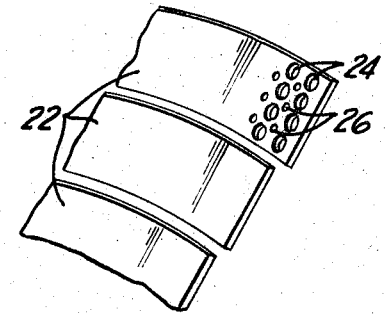
FIG. 4 is a view of a section of a reflector taken along the lines 4—4 of FIG. 3.
Figure 2:
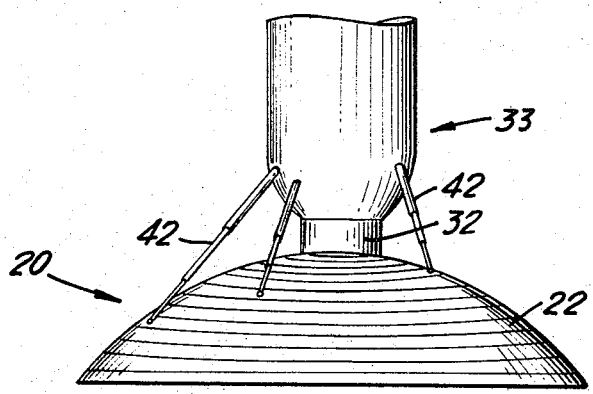
FIG. 2 shows a reflector such as depicted in FIG. 1 with a housing therefor attached to a space vehicle.

With regard to a reflector, the continuous spiral may then be lightened in weight by perforating it in the ratio of about four two-inch holes and three one-inch holes for every three inches of the reflector's spiral length (assuming of course that there is desired a reflector having a diameter of about 30 feet). In FIG. 4 there are shown substantially equally wide spiral coils 22, the larger perforations 24 and the smaller perforations 26 where the reflector has the 30-foot diameter through its point of focus, its surface area is about 720 square feet, if the material chosen is spring steel having a thickness of .01 inch, its total volume is then about .6 cubic foot. Where spring steel is used, which has a mass of about 500 pounds per cubic foot, the weight of the reflector is about 300 pounds. However, by perforating the reflector as indicated hereinabove, it may be reduced as much as 73 percent of its original weight, and accordingly, when completed, weigh about 108 pounds. It is to be noted that the width of the spiral cut and the diameters of the perforations optionally should not exceed a one-fourth wave length of the waves being reflected to insure total opacity of the reflector to the electromagnetic wave.

Figure 5:
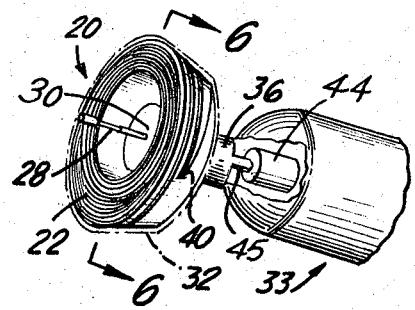
FIG. 5 shows a wound reflector configuration mounted upon a space vehicle.
Figure 3:
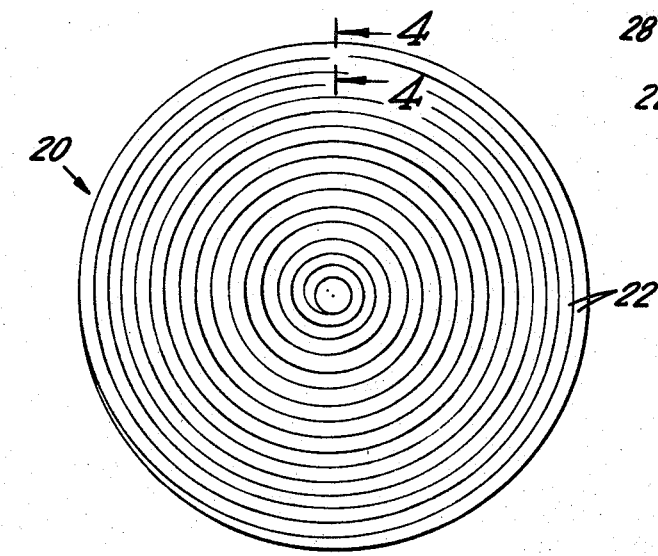
FIG. 3 is a plan view of a reflector.

After the reflector has been made, a shaft is placed therein along its axis of symmetry, the shaft extending from its center on its concave surface to its point of focus, such shaft being illustrated as structure 28 in the figures. The reflector with shaft 28 is then attached to the housing, the housing suitably being a roundish structure 32 to conform to the inwound shape of the reflector, as shown in FIGS. 2 and 5–8. In the case of the reflector 20 the housing 32 is of a shape to snugly contain the tightly wound convolutions of the coil 22 which is wound upon itself. In the case of the paraboloid 20, the housing may assume a somewhat frusto-conical shape. The housing 32 may be mounted on a contiguous neck portion 36, as shown in FIG. 6 attached to a space vehicle 33. The housing 32 may have a slot 31 therein as shown in FIG. 5 through which the coils 22 may be passed in or out of the housing 32.

Once extended the reflector 20 may be stabilized, dampened, moved or supported by struts extendable from the space vehicle 33. Any vibration or movement caused by the spring-like characteristics of the spiral coils 22 may be quickly relieved so as to make certain true reflective qualities are maintained.

The shaft 28 is preferably telescoping as are the struts 42, the means for which are not shown. For use with the reflector 20, the shaft 28 is preferably extendable to the center of focus of the paraboloid reflector 20 so that a collimated beam may be received or transmitted as shown in FIG. 8.

Telescoping of the shaft 28 is just another accommodation to size limitation for space use.

The housing 32 can be adapted to be rotatable by a motor 44 and associated shaft 45 in a like manner as shown in FIG. 5. When the housing 32 is turned, due to the action of the motor, the reflector spiral is pulled into the housing and being confined by the size of the housing, it is tightly wound up in a compact coil in the same manner as described for the shaft 45 aforementioned. It is of course to be realized that in choosing the dimensions of the housing, such dimensions must be chosen whereby the reflector can be wound into and out of the housing without being stretched or compressed beyond the limit of its elasticity. Clearly, if the reflector or other configuration's elastic limits were to be exceeded, it would lose its ability to precisely maintain its ideal predetermined shape, and therefore, its capability to be used for a predetermined purpose such as a reflector would be greatly diminished.

In considering, for example, the operation of the parabolic reflector constructed in accordance with the principles of the invention as described hereinabove, for transporting such reflector to its destination in outer space, it would be placed aboard the final stage of the space vehicle 33 which would function as the reflector's carrier vehicle. When the vehicle reached the destination and was no longer undergoing any acceleration, the command would be given to the motor to turn the associated shaft 45, and unwind the reflector. The reflector when unwound would naturally spring to its predetermined ideal paraboloidal shape since it is essentially an elastic coil made of strong resilient material. Once the reflector would be so unwound, the forces exerted by the reflector's elastic-coil structure would be sufficiently strong to substantially permanently maintain the reflector's predetermined shape in outer space, since the reflector thereat would not be subjected to a gravity force or other force sufficiently strong to overcome the elastic forces of the reflector's structure.

It is possible that in the process of being unwound at its destination, the reflector might undergo a certain amount of oscillation caused by the unwinding motion. It might also undergo a small amount of vibration since its inherent elastic character is pulling it into shape while it is being unwound. However, when the reflector is completely unwound, its elastic coil structure would be great enough to dampen and ultimately check all oscillation and vibration on its part, so as to bring it to a complete rest in its ideal shape.

In the event of danger to the reflector from predictable small meteor showers, the motor in the reflector's housing would be given the proper command to wind up the reflector on the housing to protect it during the period that such showers occur. Thereafter, once the danger of the showers had passed, the reflector could be unwound from the housing aboard its carrier vehicle.

In the event that it would become desirable to change the reflector's position in outer space to avoid subjecting the reflector to forces of acceleration and deceleration while it is in its unwound position and thereby subject to distortion by such forces, the reflector could be wound on the housing during such movement and then when a new destination had been attained in outer space, it could be then unwound again for operation.

Figure 9:
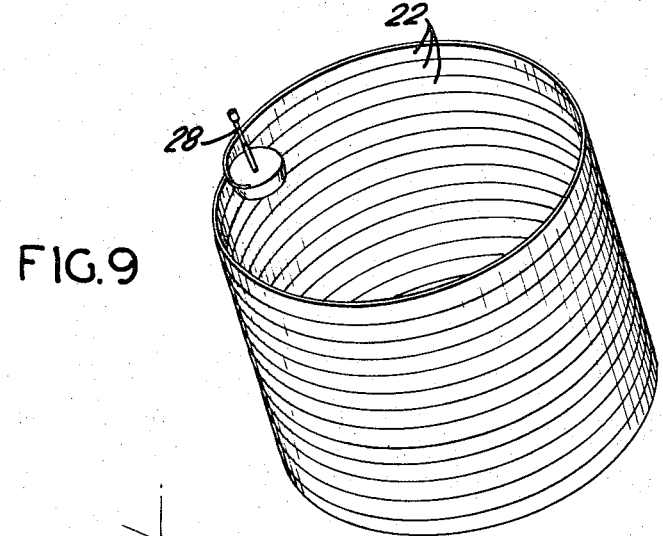
FIG. 9 shows another illustrative embodiment constructed in accordance with the principles of the invention, i.e., a cylinder.
Figure 12:
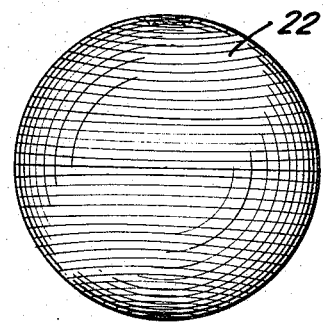
FIG. 12 shows a spherical member constructed in accordance with the principles of the present invention.
Figure 10:
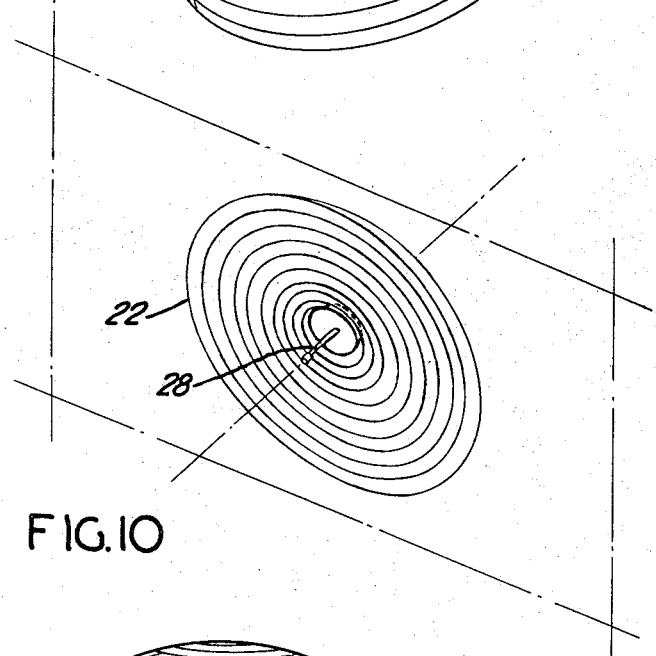
FIG. 10 shows a planar spiral disc constructed in accordance with the principles of the invention.
Figure 11:
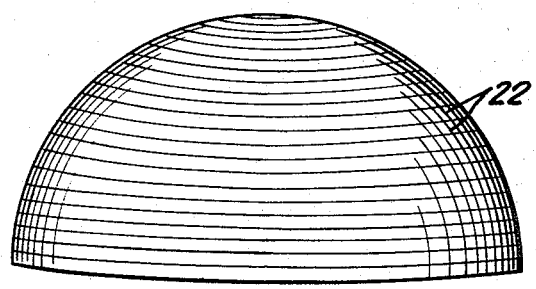
FIG. 11 shows a hemispherical member constructed in accordance with the principles of the invention.

FIGS. 9, 10, 11 and 12 show other three-dimensional structures which are examples of members that can be constructed in accordance with the principles of the invention. Thus FIG. 9 shows a cylinder having a uniform spiral cut therein. FIG. 10 shows a disc. FIG. 11 shows a hemisphere, and FIG. 12 shows a sphere.

The terms and expressions which are employed are used as terms of description, it is recognized, though, that various modifications are possible within the scope of the invention claimed.

What is claimed as new and desired to be secured by Letters Patent of the U.S. is:

1. A structure normally assuming the configuration of a predetermined figure of revolution of a given volume and capable of being contracted to a volume substantially less than said given volume comprising a member having said configuration and volume and comprising a strong resilient material, and a continuous cut in said member whereby said member can be tightly confined to said lesser volume and which precisely reverts to said configuration upon release from said confinement.

2. A structure normally assuming the configuration of a predetermined figure of revolution of a given volume and capable of being contracted to a volume substantially less than said given volume, comprising a member having said configuration and volume and comprising a strong resilient material, and a continuous spiral cut in said member whereby said member can be tightly confined to said lesser volume and which precisely reverts to said configuration upon release from said confinement.

3. A structure normally assuming a predetermined configuration of a given volume and capable of being contracted to a volume substantially less than said given volume comprising a member having said configuration and given volume comprising a strong resilient material and a continuous cut in said member whereby said member can be tightly confined to said lesser volume and which precisely reverts to said configuration upon its release from said confinement.

4. A structure as defined in claim 3 in which said member is a cylinder.

5. A structure as defined in claim 3 in which said member is a hemisphere.

6. A structure as defined in claim 3 in which said member is a sphere.

7. A structure as defined in claim 3 in which said member is a disc.

8. A structure normally assuming a predetermined configuration of a given volume and capable of being contracted to a volume substantially less than said given volume comprising a member having said configuration and given volume comprising a strong resilient material and a continuous spiral cut in said member whereby said member can be tightly confined to said lesser volume and which precisely reverts to said configuration upon its release from said confinement.

9. A structure normally assuming the configuration of a paraboloid of revolution of a given volume and capable of being contracted to a volume substantially less than said given volume comprising a member having said configuration and given volume and comprising a strong resilient material and continuous spiral cut in said member whereby said member can be tightly wound to its lesser volume and which precisely reverts to said configuration upon its being unwound.

10. A paraboloid as defined in claim 9 including a radiator-antenna extendable to the focus of said paraboloid.

11. A reflector for use in radio communication systems comprising a structure normally assuming the configuration of a paraboloid of revolution having a given volume and capable of being contracted to a volume substantially less than said given volume comprising a strong resilient material, a continuous spiral cut in said member whereby said member can be tightly wound to said lesser volume, and a center post extending at least a plurality of wavelengths from the geometric center of the concave surface of said member.

12. A reflector for use in electromagnetic wave communications in outer spiral comprising a structure normally assuming the configuration of a paraboloid of revolution of a given volume and capable of being contracted to a volume substantially less than said given volume comprising a member having said configuration and given volume and comprising a strong, thin, resilient material, a continuous spiral cut in said member to define abutting substantially equal width coils disposed substantially perpendicular to the axis of symmetry of said member, the widths of the spacing between said abutting coils not exceeding a small fraction of a wave length, whereby said member can be tightly wound to said lesser volume, and which precisely reverts to said configuration upon its being unwound and a center post extending at least a plurality of wave lengths from the geometric center of the concave surface of said member.

13. A reflector for use in electromagnetic communications in outer space comprising a structure normally assuming the configuration of a paraboloid of revolution of a given volume and capable of being contracted to a volume substantially less than said given volume comprising a member having said configuration and given volume and comprising a strong, thin resilient material, a continuous spiral cut in said member to define abutting substantially equal width coils disposed substantially perpendicular to the axis of symmetry of said member, the spacing between said abutting coils not exceeding a small fraction of a wave length, whereby said member can be tightly wound to said lesser volume and which precisely reverts to said configuration upon its being unwound, electromagnetic wave radiating means comprises a center shaft extending from the center of the concave surface of said member to the focal point of said member, rotatable means for supporting said spirally cut member and for winding therearound about said spirally cut member, housing means for carrying said rotatable means and anchoring an initial portion of the spiral comprising said spiral coils, to said rotatable means, and means for rotating said rotatable means to tightly wind said member therearound.

14. A reflector as defined in claim 13 wherein said rotatable means is of frusto-conical configuration, said member being supported on a larger base of said rotatable means and wherein said rotating means includes a motor having a shaft operatively coupled to said rotatable means.

15. A reflector as defined in claim 14 wherein said housing comprises a slotted opening in a wall thereof for receiving said initial portion to anchor said initial portion.

16. A reflector as defined in claim 15 wherein said member has substantially disposed perforations therethrough.

17. A reflector as defined in claim 16 wherein said resilient material is spring steel.

18. A reflector defined in claim 17 wherein the diameters of said perforations do not exceed one fourth wave length.

19. A method of making a reflector for use in radio communications in outer space which normally assumes the configuration of a predetermined paraboloid of revolution of a given volume and which is capable of being contracted to a volume substantially less than said given volume comprising the steps of shaping a sheet of strong resilient material on a form having said paraboloid configuration to provide a member comprising said material having said configuration and of a substantially uniform thickness of said material and making a spiral cut of a chosen width in said formed member to provide a continuous spiral having substantially equal width coils.

20. A method as defined in claim 19 and including the further step of providing perforations substantially uniformly spaced throughout said member.

21. A method as defined in claim 20 and including the further step of attaching the center of the convex surface of said member to a housing having a tapered spindle section, said attachment being made on said section, and anchoring an initial portion of said spiral on said housing to enable said spiral to be tightly wound on said spindle section.

References Cited

UNITED STATES PATENTS

| | | | |
|---|---|---|---|
| 2,009,496 | 7/1935 | Johnson | 113—116 X |
| 2,756,948 | 7/1956 | Winzen | 244—31 |
| 2,763,002 | 9/1956 | Fitzgerald | 343—18 X |
| 2,806,134 | 9/1957 | Tarcici | 240—103 |
| 3,064,534 | 11/1962 | Tumavicus | 343—18 |
| 3,240,073 | 3/1966 | Pitzer | 267—1 X |

RODNEY D. BENNETT, *Primary Examiner.*

CHESTER L. JUSTUS, *Examiner.*

G. M. FISHER, D. C. KAUFMAN, *Assistant Examiners.*

UNITED STATES PATENT OFFICE
CERTIFICATE OF CORRECTION

Patent No. 3,337,871                        August 22, 1967

Gerald B. Greenberg et al.

It is hereby certified that error appears in the above numbered patent requiring correction and that the said Letters Patent should read as corrected below.

In the heading to the printed specification, lines 4 and 5, for "assignors to Telar Associates, Inc., New York, N. Y., a corporation of New York" read -- assignor, by mesne assignments, to Gerald B. Greenberg, Bronx, N. Y. --.

Signed and sealed this 2nd day of July 1968.

(SEAL)

Attest:

Edward M. Fletcher, Jr.

Attesting Officer

EDWARD J. BRENNER

Commissioner of Patents